(12) United States Patent
Gentile et al.

(10) Patent No.: US 7,572,189 B2
(45) Date of Patent: Aug. 11, 2009

(54) STRUCTURE FOR RAISING PERSONS BY MEANS OF AN AIR FLOW

(75) Inventors: Francesco Gentile, Rome (IT); Anita Galigani, Trigoria Alta (IT)

(73) Assignee: Free Flight S.r.l., Verona (IT)

( * ) Notice: Subject to any disclaimer, the term of this patent is extended or adjusted under 35 U.S.C. 154(b) by 266 days.

(21) Appl. No.: 10/583,043

(22) PCT Filed: Mar. 31, 2004

(86) PCT No.: PCT/IT2004/000162

§ 371 (c)(1),
(2), (4) Date: Jun. 15, 2006

(87) PCT Pub. No.: WO2005/058697

PCT Pub. Date: Jun. 30, 2005

(65) Prior Publication Data

US 2007/0129157 A1    Jun. 7, 2007

(30) Foreign Application Priority Data

Dec. 16, 2003    (IT)    ........................ RM2003A0577

(51) Int. Cl.
*A63G 31/04* (2006.01)
*G09B 9/08* (2006.01)

(52) U.S. Cl. .................... 472/50; 472/130; 472/137; 434/247; 73/147

(58) Field of Classification Search ............... 472/49, 472/50, 68, 136, 137; 434/247, 258, 59; 73/147

See application file for complete search history.

(56) References Cited

U.S. PATENT DOCUMENTS

| 4,700,565 | A | * | 10/1987 | Albuschkat | 73/147 |
| 5,209,702 | A | | 5/1993 | Arenas | |
| 5,593,352 | A | * | 1/1997 | Methfessel et al. | 472/50 |
| 5,655,909 | A | * | 8/1997 | Kitchen et al. | 434/44 |
| 5,753,811 | A | * | 5/1998 | Consolini | 73/147 |
| 6,083,110 | A | | 7/2000 | Kitchen | |
| 6,139,439 | A | | 10/2000 | Ure | |
| 6,315,672 | B1 | * | 11/2001 | Gillot et al. | 472/50 |
| 7,153,136 | B2 | * | 12/2006 | Hatlestad et al. | 434/59 |

FOREIGN PATENT DOCUMENTS

WO    WO 00/59595    10/2000

* cited by examiner

*Primary Examiner*—Kien T Nguyen
(74) *Attorney, Agent, or Firm*—Young & Thompson (57) ABSTRACT

A structure used to raise persons by use of air jets (currents), includes several flight positions (3). Each flight position is associated with a device (1) that generates a vertical air flow, whose flow rate and intensity are constantly monitored from a control room (9) provided with an alphanumeric display. The device (1) includes a variable pitch propeller (6) driven by an electric motor whose rpm is adjusted using an inverter. An electric signal from a balance (7) is processed in order to determine what frequency the motor supply current should have to raise a participant of this weight up to a maximum height which is preferably about 2.5 to 3 meters.

15 Claims, 7 Drawing Sheets

STRUCTURE FOR RAISING PERSONS BY MEANS OF AN AIR FLOW

TECHNICAL FIELD

The present invention relates to a structure used to raise persons by means of air jets (air currents), which comprises several identical devices generating vertical air currents. This structure is used e.g. in funfairs or the like, for entertainment purposes, to let the participants in this "game" feel the thrill of flight, or alternatively, it may also be used in any other related place or application.

BACKGROUND ART

The related known art includes first of all the so-called wind tunnels, which are only employed for aerodynamic studies, and which range from those used to perform laboratory tests on models, to the great structures utilised for aerodynamic tests on real-size automobiles and aeroplanes. They are fed by means of bulb fans. Secondly, there exist wind tunnels used for the physical training of paratroops or parachutists, for military or civilian applications respectively. These are fixed structures, having large sizes and high costs, and are fed by a plurality of parallel fans to insure a suitable flow rate.

Instead, the present invention essentially relates to structures realised for entertainment purposes inside funfairs. For this kind of applications, it is particularly important that the structure be capable of: handling in an optimum manner the streams of participants (in order to insure big profits); insuring the participants' safety: providing adequate means for spectators; preventing participants from being seized by panic (these participants cannot obviously be compared to a skilled parachutist); and providing means for acting promptly, in the latter circumstance. Therefore, it may be noted that problems inherent in such entertainment structures, like the structure of the present invention, are very different from those of a structure used for military training purposes, or from those concerning structures like the wind tunnels employed for aerodynamic studies.

However, turning again our attention, only for a moment, to the general case of wind tunnels and their related technologies, the following patents are worth mentioning: U.S. Pat. No. 5,209,702; U.S. Pat. No. 5,593,352; U.S. Pat. No. 5,753, 811; U.S. Pat. No. 6,378,361; and U.S. Pat. No. 6,083,110; the U.S. Pat. No. 6,378,361 having been extended in Europe as EP 1.069.420.

The first of these patents concerns a fixed wind tunnel, including two hydraulic motors. The air flow is adjusted according to the ideal weight (fitness weight) and size of the participant, but no indication is given as to how this adjustment is carried out; moreover, no balance is provided to exactly determine the weight of a person. The fact that this structure is a fixed structure, is a drawback that limits its applications.

The second patent, U.S. Pat. No. 5,593,352, does not disclose stands for spectators, it does not disclose an electric motor, or a change gear (speed gear) for the rotor that generates the flow. It does not take into account any kind of system for accurately determining the participant's weight, which could automatically act on the control of the fan blades inclination, so as to vary the pitch, in order to regulate the air flow.

It is not our intention to discuss in detail all further aspects of the remaining cited patents; instead, we only mention that some of them (the third patent) concern fixed military training structures, while others (e.g. the fourth patent), disclose specific features of a wind tunnel used for aerodynamic studies (having a bulb fan connected to the motor); in any case, all cited patents do not disclose any electric motor driving the fan (rotor) in a controlled manner, and acting at the same time according to two different flow regulation criteria (adjustment of the variable pitch and of the rpm), based on the exact weight of the user.

From the preceding observations it can be concluded that there is currently the need for a structure specifically designed for funfairs, or for similar applications, and which may be fixed, travelling, or transportable, which allows to adjust the air flow based on the exact weight of each user (participant), which optimally regulates the participants streams, which insures the maximum reliability as regards safety, and in particular, which provides for means capable of intervening when a participant is seized by panic, by gradually decreasing the fan flow rate.

Specifically, the flow rate will be gradually reduced during the final period up to the end of the game's turn, before the entry of the next group of participants, whereas it will be gradually increased during the initial period of the game's turn. This kind of system insures the maximum amusement, since the user, after having reached its "flight position", can be safely and gradually raised up to an optimum height, by the air jet that was automatically computed beforehand, based on the user's weight which was exactly determined by an appropriate balance. At the end of a game turn (that may last for example three minutes), each participant will gradually and safely return to the level of the elastic grid of its flight position, by gradually reducing the air flow rate to a minimum value.

The above objects of the present invention are achieved by means of a structure as claimed in the device.

The main feature of the structure of the present invention, as opposed to the known art, is that the apparatus that generates the air flow consists in a variable pitch rotor (or propeller) driven by an electric motor, whose rpm is controlled by an inverter, and the latter, according to the exact weight (in the form of an electric signal) provided by a balance for determining the weight of the "flying man" (user), varies the frequency of the electric current fed to the electric motor, and consequently, also the flow rate of the air current produced by the propeller, up to a maximum flow rate corresponding to a maximum predetermined height of the flying man above his flight position. This structure has several advantages that will clearly result from the description.

Moreover, when using the inverter it is also possible to gradually reduce—or gradually increase—the rpm (rounds per minute) of the propeller, thereby insuring the maximum safety for the user, and with a minimum percentage error in the rpm value. For other motors, e.g. diesel motors, the rpm is not easily controllable. For instance, the speed change of a diesel motor offers only a limited number of transmission ratios.

Therefore, an electric motor combined with an inverter has remarkable advantages. The electric motor associated with each flight position is operated at a minimum rpm value Nmin—which can be preset—between different game turns, when the participants are getting ready to put on the flight overalls (flight suits) and the helmet, and to weigh themselves on respective balances. This procedure saves the energy required to start again the motors associated with the various flight positions, and lowers at the same time the loads acting on the joint between the driving shaft and the variable pitch propeller. In fact, the greatest loads occur during the start stage. By reducing the loads acting on the joint and on the motor itself, the mean life of these components can be extended.

Other fundamental advantages offered by a structure for funfairs, amusement parks, etc., such as that described in this document, will result from the following more detailed description and when the invention itself is put into practice.

BRIEF DESCRIPTION OF DRAWINGS

The present invention and its advantages will best be described with reference to a preferred embodiment thereof, which is shown in the drawings, in which.

DESCRIPTION OF PREFERRED EMBODIMENTS

Figure 1:
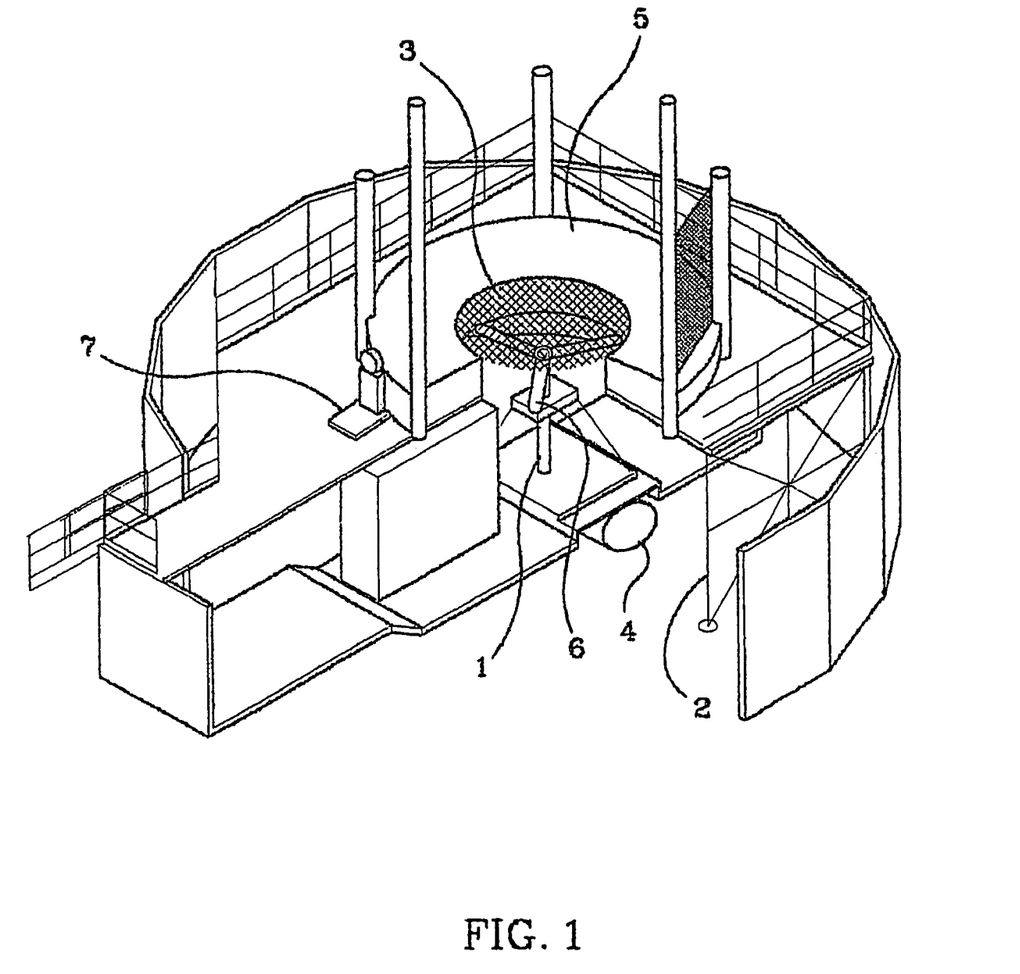
FIGS. 1 to 3 show possible variants of a structure used to raise persons by means of air jets, according to the present invention, with regard to a single flight position.

Referring to FIG. 1, it shows a structure according to the present invention generally including a support structure 2, supporting—in the present case—only one device 1 for raising a person, which is formed by:

a suction-and-delivery duct 4, wherein the delivery outlet of the duct is arranged vertically and ends in proximity of a plane defined by a central zone of the structure, this zone being called "grid 3", or "flight position 3", a propeller 6, having a variable pitch (only schematically shown in the drawing), which is received in the duct 4, in its end portion (delivery portion), and which sucks air from a suction inlet of the duct 4, so as to generate an air flow or air jet directed vertically upwards;

one or more superimposed elastic membranes or nets 3, suited to support the body of a person, also in the event of a free fall from a maximum predetermined height corresponding to the maximum flow rate of the propeller, that is related to the weight of this person, as determined by a weighing unit or load cell 7; wherein said elastic nets 3 are provided above the delivery outlet of the duct 4, and are obviously sufficiently permeable to air to allow the passage of the air which lifts the person, which are located around said delivery outlet on the elastic net or membrane 3 permeable to air.

Several superimposed membranes 3, instead of only one membrane, obviously insure an increased safety.

The reference numeral 1 generally denotes the whole device suited to raise a person, including the motor (not shown), the duct 4, the variable pitch propeller 6, etc.

A user who wants to reach the flight position or grid 3, formed by the elastic membrane, must do the following:

he must take a ticket;

he must put on a particular flight suit, for improving the lift effect, which is not part of the matter claimed in this patent application;

he must head towards the flight position and put on a protective helmet (not forming part of the claimed invention);

he must get on a balance 7 used to determine the exact weight of the user (including that of the helmet and flight suit);

he must reach the flight position 3, to start the controlled flight.

Already at this point it should be noted that the person's exact weight is determined, and that the latter is automatically transmitted in real-time to a control unit or control centre (not shown in FIG. 1) inside a control room; moreover, in a fully automatic way (in a manner described later on), the power transmitted to the propeller 6 is adjusted according to the user's weight, or flying man's weight.

It should be noted that this exact weighing procedure makes use of an electric signal which is proportional to the person's weight, and which is transmitted to an automatic regulation system of the electric motor that rotates the propeller 6.

In practice, the propeller 6 is a variable pitch propeller, whose pitch is regulated according to the electronic input obtained by the load cell 7. Moreover, said regulation system of the electric motor driving the propeller 6 includes an inverter, which, by varying the frequency of the electric current fed to the motor, causes the variation of the rpm of the electric motor and consequently also a variation of the angular velocity of the propeller 6.

Both systems, that is, the inverter and the variable pitch propeller 6, cooperate in programming the user's flight at a height comprised in the interval 2.5-3 meters above the flight position (grid) 3. Therefore, this height is automatically obtained by the vertical air flow, which in turn has been electronically set according to the electric signal sent to the control room by the weighing unit 7.

It should be noted that the inverter, which is associated with the electric motor, is an advantageous means allowing to lower the power required by the electric motor during its start.

In the event of an interruption of power supply on the national electric network, the generating set employed in this case need not be "oversized" for supplying a power three times larger than the nominal power for steady operation.

This regulation—or variation—system happens to be extremely reliable and convenient, in that it "naturally" lends itself to a use in combination with the electronic weighing system 7; in fact, the inverter immediately acquires the electric signal generated by the balance 7, and it varies the frequency of the electric current at the motor's input, and consequently the rpm of the propeller 6, thereby obtaining the desired velocity of the air flow, which preferably lifts the participant up to a level of about 2.5-3 meters above the grid 3.

Preferably, according to the present invention, between successive turns of this "skydiving" game performed above the flight grid 3, the electric motor is not stopped but continues to rotate at a minimum preset number of turns (rpm), between subsequent weighing operations and the access of successive users to the grid. In this manner it will be possible, on the one hand, to drastically reduce energy costs, and therefore also the operation costs taken as a whole, and on the other, to reduce the loads applied to the joint and the drive shaft during the various stages of the motor's start. This latter point is extremely important, since the stresses to which the joint between the drive shaft (of the motor) and the propeller shaft is subjected during the propeller starting phase, constitute the primary cause of reduction of the mean life of the joint.

Therefore, if the propeller continues to rotate at a minimum number of turns, maintenance interventions can be noticeably reduced.

Consequently, this combined "variable-pitch-propeller and inverter" system also allows to gradually switch from a 'minimum energy consumption rotation mode', that could also be defined as 'stand-by mode', to a 'maximum angular velocity rotation mode' (corresponding to a user's weight), with a predetermined (preset) inclination of the blades of the variable pitch propeller 6.

For what concerns the procedural steps, the user first gets on the weighing dish of the balance 7, whose maximum range preferably is 150 Kg and whose stainless steel surface measures 0.64 square meters. A load cell determines the user's weight and outputs an electric signal proportional to this weight, the latter being transmitted to the control room. This will permit to adjust, in the above described manner, the rpm of the motor and the pitch of the propeller 6 (inclination of the propeller blades). In the control room there is an alphanumeric display which is connected to a central unit (connector) of the weighing system 7.

The alphanumeric display performs several functions:

(i) the control and adjustment of the rpm of the propeller, based on the user's weight (weight of the "flying man"), which is determined by pressure sensors;

(ii) the detection of the air speed and the controlled stop in case of a deviation from the preset value beyond a predetermined threshold;

(iii) the recording of the machine usage period and the statistical memorisation of possible malfunctions or failures.

With regard to (iii), the storing and processing of various statistical information allow to prevent failures due to the usage and loads, thereby obtaining an economical advantage, since it will be possible to schedule the ordinary maintenance interventions with a certain degree of accuracy.

In connection with point (ii) above, the expression "controlled stop" means that the inverter progressively reduces the rpm of the motor until the flow rate reaches its minimum value, which may correspond to the flow rate at the beginning of each turn. Once the user's weight data have been transmitted, the user "leans" upon the air flow, which is now adjusted to correspond to the minimum value, the latter being not yet equal to the lift value for steady operation, but sufficient to start the flight at a height of e.g. 1 meter. Subsequently, the regulation system, relying on the inverter and on the possibility of varying the propeller pitch, gradually increases the air flow up to a maximum value (which is calculated beforehand based on the load cell), thereby lifting the participant up to a predetermined height of between 2.5 and 3 meters from the flight grid 3. In a fully analogous way, near the end of the game the air flow is modulated (that is reduced), letting the participant descend in a completely controlled and safe manner.

Figure 2:
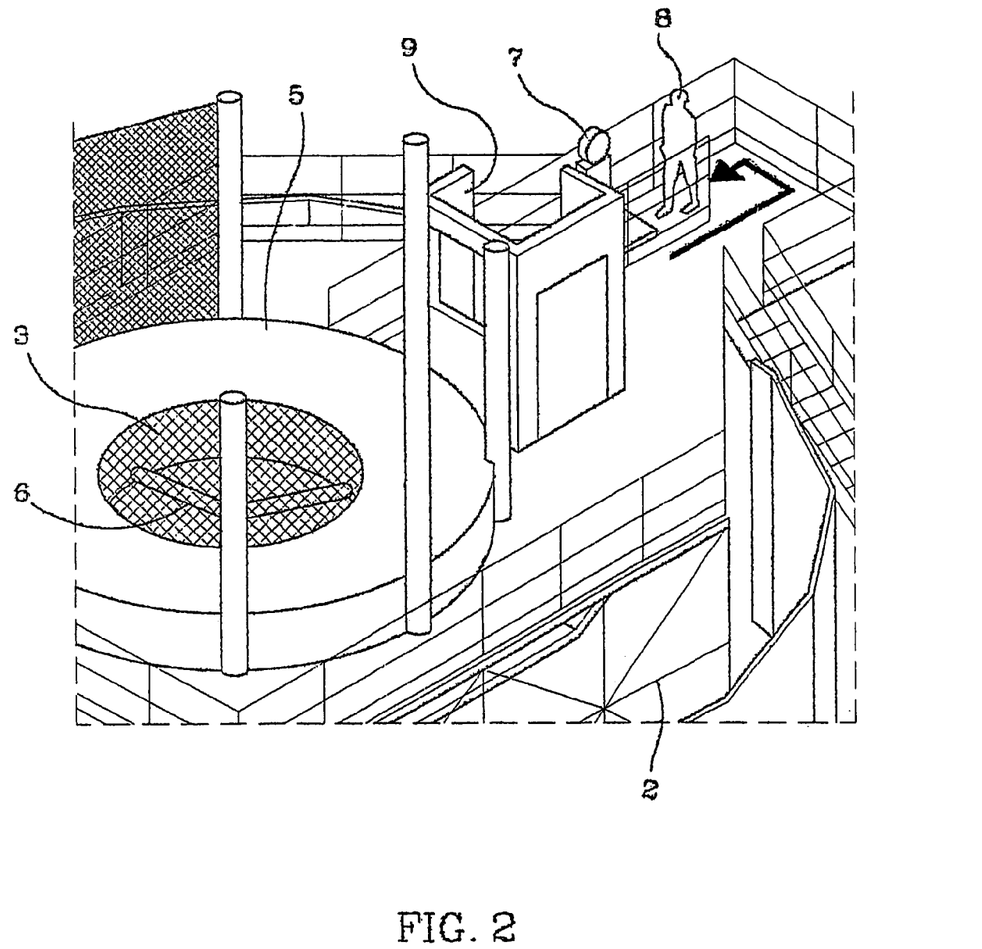
Figure 3:
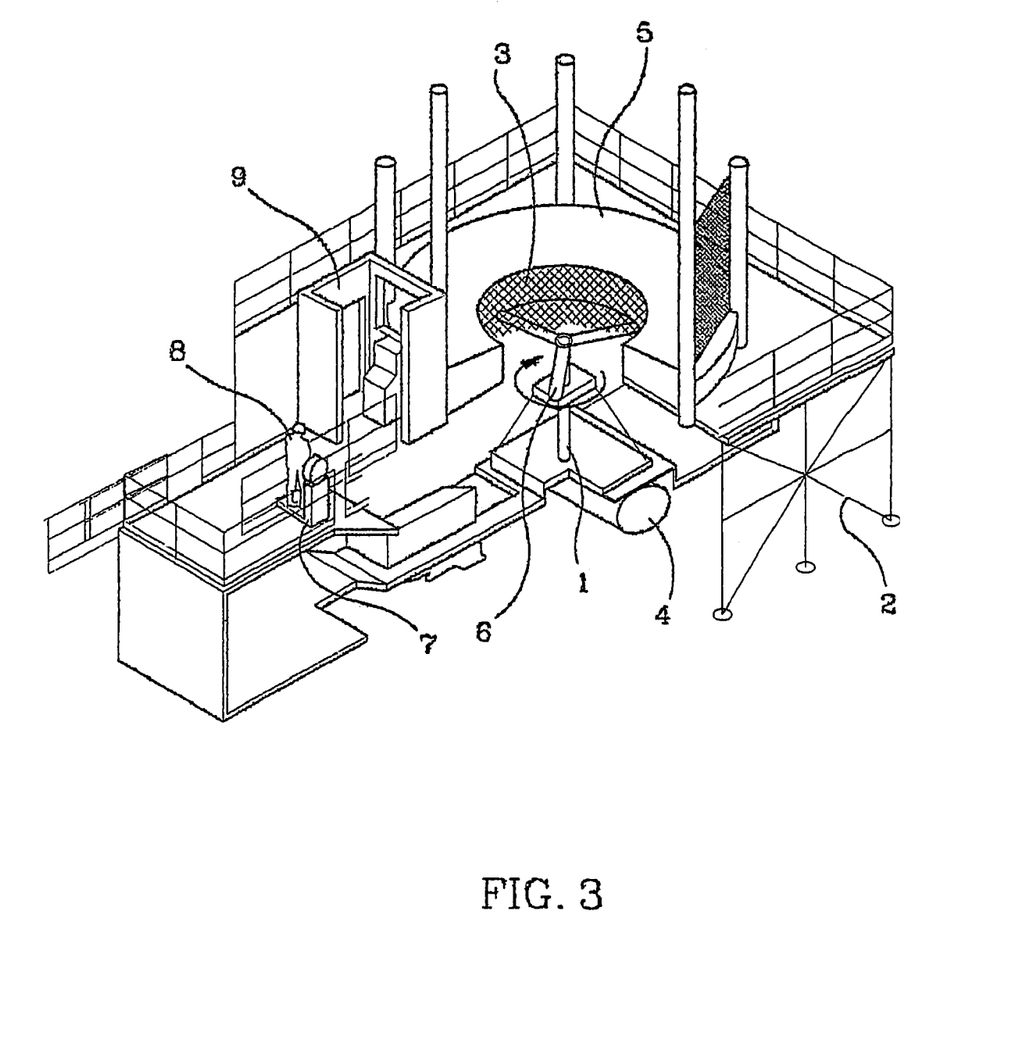

From the above description it can be seen that the present structure has an extremely high commercial value, since it allows users of different ages, body sizes, and experience, to fly under totally safe conditions, by programming the maximum reachable height in a way to reduce the risk of a participant being seized by panic. Actually, a height of 2.5-3 meters is not perceived as risky by the majority of people, whereas greater heights could lead to sensations of uneasiness, thereby reducing the pleasure experienced during the flight, whilst one of the objects of the present invention is indeed to amplify the positive sensations related to the flight. The variant of FIG. 2 shows a possible arrangement of the balance 7 and of the control room 9. The special flight suit, when it is "hit" by the air flow, amplifies the upwardly directed thrust by virtue of the greater area which is hit by the flow itself (according to the formula F=p×A, where 'A' is the hit area and 'p' the pressure). FIG. 3 shows another possible arrangement of the control room 9 and of the balance 7.

Figure 4:
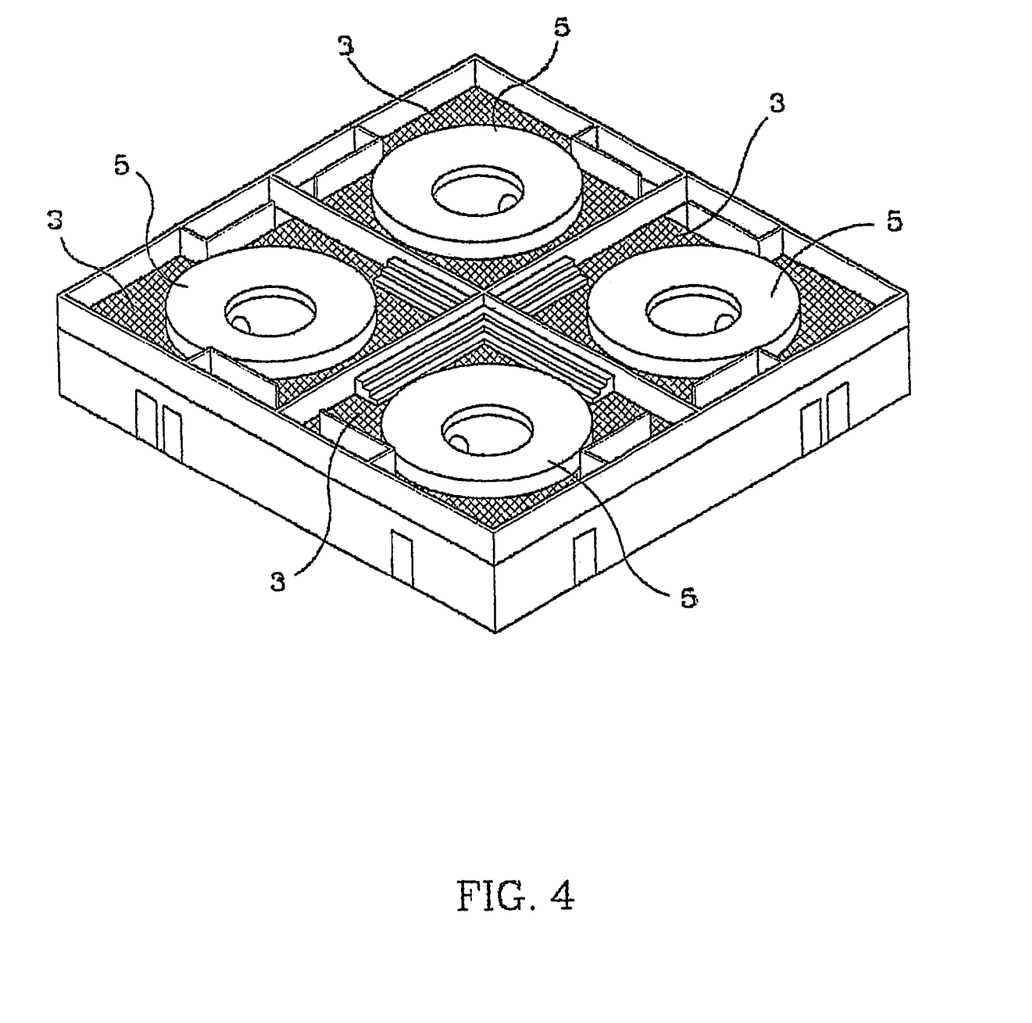
FIG. 4 schematically shows an assembly of four flight positions.

FIG. 4 shows an assembly of four modules (including a flight position for each module). In this case each flight grid will be associated with: an inverter, a motor, a joint between the driving shaft and the propeller, and a variable pitch propeller. The distances between the flight grids 3 are chosen to prevent contacts among the participants in the flight.

Figure 5:
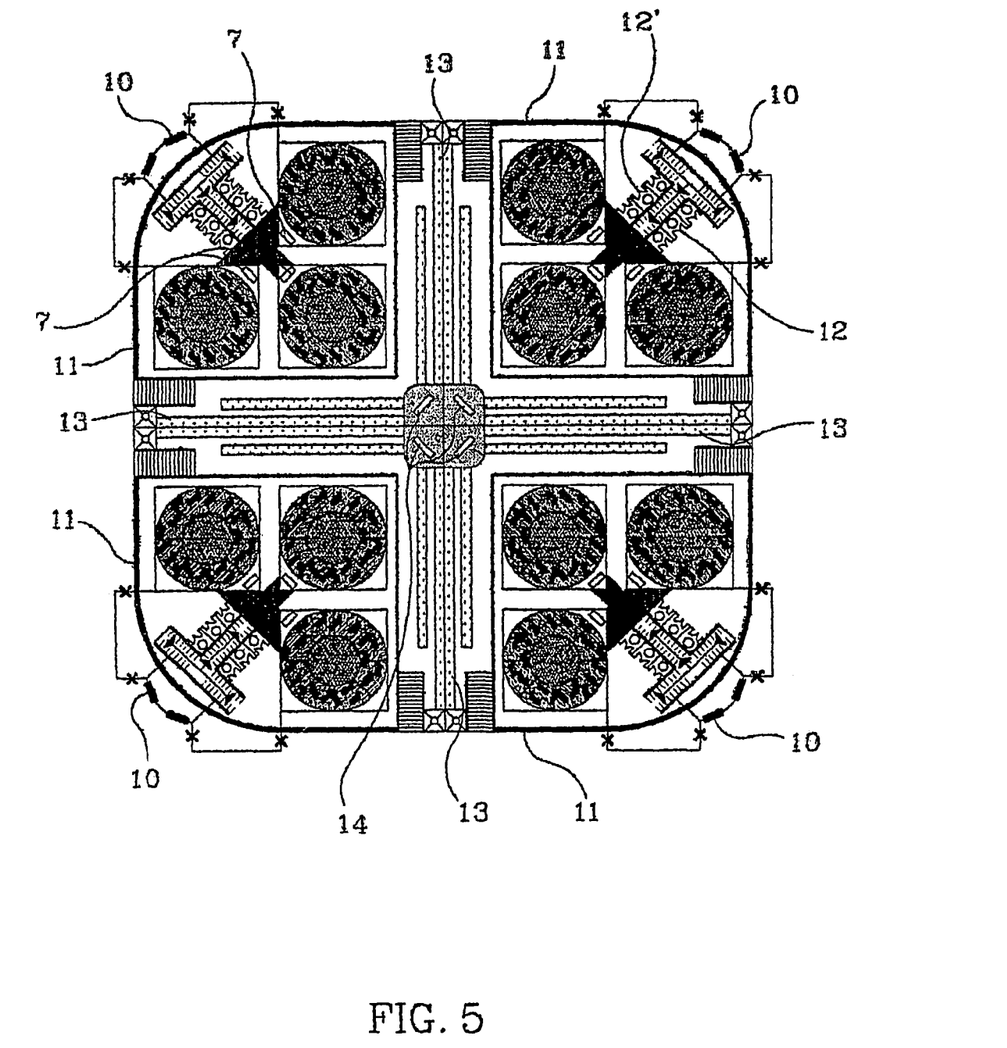
FIG. 5 is a plan view of a structure including four modules, each having three flight positions.
Figure 6:
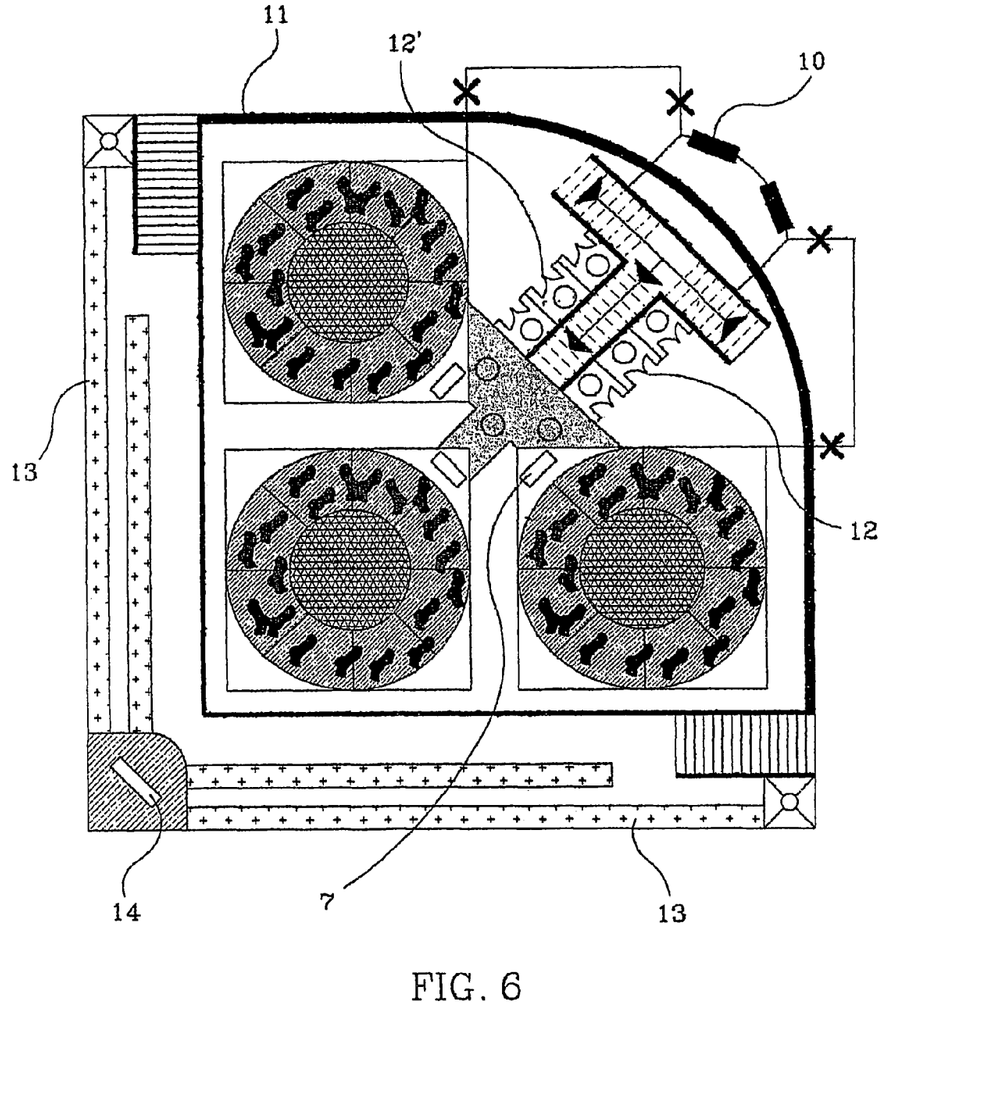
FIG. 6 is a plan view of a single module with three flight positions, shown individually.

Referring in particular to FIG. 5, it shows four modules having each three flight positions (each module includes three flight grids 3 and a respective device 1). FIG. 6 shows a single module taken individually. The modularity of the structure guarantees a higher versatility of use, allowing to adapt the same to various situations, according to: maximum size requirements, possible number of participants in a given place, and consequent optimisation of the handling of the users stream).

In particular, FIG. 5 shows at the four corners the four cash desks 10 where a ticket may be bought, the stands 13 for the spectators, which are arranged in a cross-like configuration between the four structure's modules, six boxes (huts) 12, 12' for each module, and three balances 7 for each module, and finally, the four curved screens 11 for projecting 3D pictures. The users and/or the spectators on the stands 13 may then wear special spectacles allowing to see the 3D-pictures that are projected on the screens. Six boxes or huts 12-12' are required for each module because at the end of each flight turn (lasting e.g. for 3 minutes), while three flying men take off their overalls (flight suits) and helmets inside the boxes 12, other three flying men (who have not flown yet) put on the same clothes inside the other three huts 12'. The control room is in this case provided in the middle, and it includes four separate positions 14, each one for monitoring each module (see also FIG. 6, showing only one module with three flight positions).

The control room of FIG. 5 could also include only one position with a 360°-visibility for all twelve flight grids.

The configuration of FIG. 5 implies an optimisation of the "users streams", and therefore greater profits.

Some remarks will now be made in relation to the various devices 1 associated with respective flight grids.

The motor of each device 1 is mounted on respective supports, and the position of its output shaft could either be horizontal or vertical. Since the electric current provided by the network has a fixed frequency of 50 Hz, which would be a restraint to the rotation, then, by using an inverter it becomes possible to vary the frequency of the current fed to the motor and therefore to overcome any technical limitations, as has already been described.

The motion transmitted by the motor to the variable pitch propeller will be transmitted through a motor reducer. If the motor output shaft is vertical, it is possible to use a simple speed reducer (reduction gear), but if the motor output shaft is horizontal, the reducer will be connected to an appropriate gear transmission.

If the motor has a horizontal output shaft, the coupling of the two shafts will be insured by an elastic joint or oleodynamic joint.

In general, the real object of the present invention is to counterbalance the user's weight by adjusting the air flow in an extremely accurate manner, according to the weight that was previously determined by the balance 7 and that was transmitted to the regulation system. Generally, this adjustment of the air flow could be accomplished in three different ways:

(i) by varying the rpm of the motor;

(ii) by using a speed change;

(iii) by using a variable pitch propeller.

Tests made by the inventor have shown that the method of varying the rpm is not applicable to a diesel motor, since it is not accurate enough, taking account of the relevant power values, and therefore it does not insure indispensable safety requirements to users, especially in a structure for funfairs or the like, in which a large number of persons take part to the game and alternately reach their flight positions in a rapid succession (e.g. 3 minutes for each flight turn, and 12 flight positions as in FIG. 5). On the contrary, when an electric motor is used, the method of varying the rpm insures an error margin of 0.5%, and therefore it is much more accurate and becomes indispensable to prevent accidents when varying the speed. The use of a speed change (point (ii)) could be conceived only in case of a diesel motor, but this alternative implies a limited number of transmission ratios, and consequently a limited number of velocities of the output air flow.

Finally, with regard to point (iii), the variable pitch propeller insures an ample range of regulation possibilities, but a flow velocity regulation that relies entirely on this system is not applicable to the present case, because this velocity variation would consist in small angular variations of the propeller and could not cover the whole range of required velocity values.

At last, the electric motor, as compared with the diesel motor, has a higher efficiency and a reduced noise, and moreover, it is not polluting.

Besides the motor and the inverter, an encoder is also provided. The use of these components allows to vary the frequency of the current in order to vary the rpm of the motor, as required to support users of different sizes.

The motor shaft is preferably mounted in a vertical direction, on rolling-contact bearings, and it is connected to the support structure by means of appropriate thrust bearings. The respective parameters, such as the internal gap (play) between the shaft and the bearing, the coupling tolerance, the life of the bearings, and the best lubricant, are all chosen in such a way as to optimise the structure of the invention with respect to cost reduction of maintenance works, to the frequency of maintenance works, etc.

The connection between motor and propeller shaft is effected by means of an elastic joint, which, taking account of the power values involved, is able to attenuate angular accelerations that would be detrimental to these components.

These parts are designed, studied and realised appositely for the "free flight".

A kind of joint that can be used, is called "Rupex RWN", available from FLENDER S.p.A. The joint is also specifically realised for the free flight.

The shaft and the joint are dynamically balanced to avoid detrimental vibrations that would cause fatigue stresses and a premature failure of these parts.

According to a particular realisation of the invention, the structure could be partially laid underground. If it is allowed by the particular regulations of a specific installation place, the structure could be put inside an undergrounded basin made of reinforced concrete, and could project by about 0.5-1 meters from ground level. In such a case, all apparatus will be provided within this reinforced concrete basin. This solution can offer several advantages, especially inside holiday villages, which are visited by the public only for 4.5 months during the year; it will then be possible to put the plant off service (at rest) and insure at the same time its protection during the winter, and it will also be possible, when the plant is operated, to increase the visibility (of the game) for spectators outside the structure itself (which are now located at ground level).

Turning again to the general case, the external configuration of the structure may be closed, and have a circular, a rectangular, or any other shape whatever, and could include attractive and decorative parts. The stands for the spectators could be covered, and could be separated by means of protective rigid or non-rigid parapets or the like. Moreover, the function of these parapets is to avoid at the same time that spectators have a free access to the flight zone, although they should not reduce visibility. The distance between the spectators stands and the flight zone is selected in such a way that those persons who are suspended in the air could never reach—in case of their fall—the spectators stands or a rigid parapet.

The stuffing, indicated by numeral 5 in FIGS. 1-4, which surrounds the central flying grid traversed by the air flow, could be formed for instance by pillows that automatically deflate in case of impact, or alternatively, by foam rubber pillows, etc. Each flight position will be sufficiently distanced from the other to prevent contacts between the participants in the game.

The structure will be a modular one, and could be either fixed, itinerant, or transportable, and in particular this means that preferably the various devices 1 will be identical. However, in a possible realisation it is not to be excluded that, for instance, some flight positions have sizes smaller than other ones, in a case where the primary need is to optimise the overall dimensions of the flight zone by letting at the same time participate persons of various ages.

The structure is realised in a manner to allow the safest and easiest possible assembling and disassembling operations; after disassembling, the structure can easily be transported by an articulated lorry.

However, it is also possible to mount the motor part on a wheeled trolley, so that, by disassembling the outer parts 2 of the structure, all parts can be transported in a manner similar to other structures used today for "travelling shows".

Figure 7:
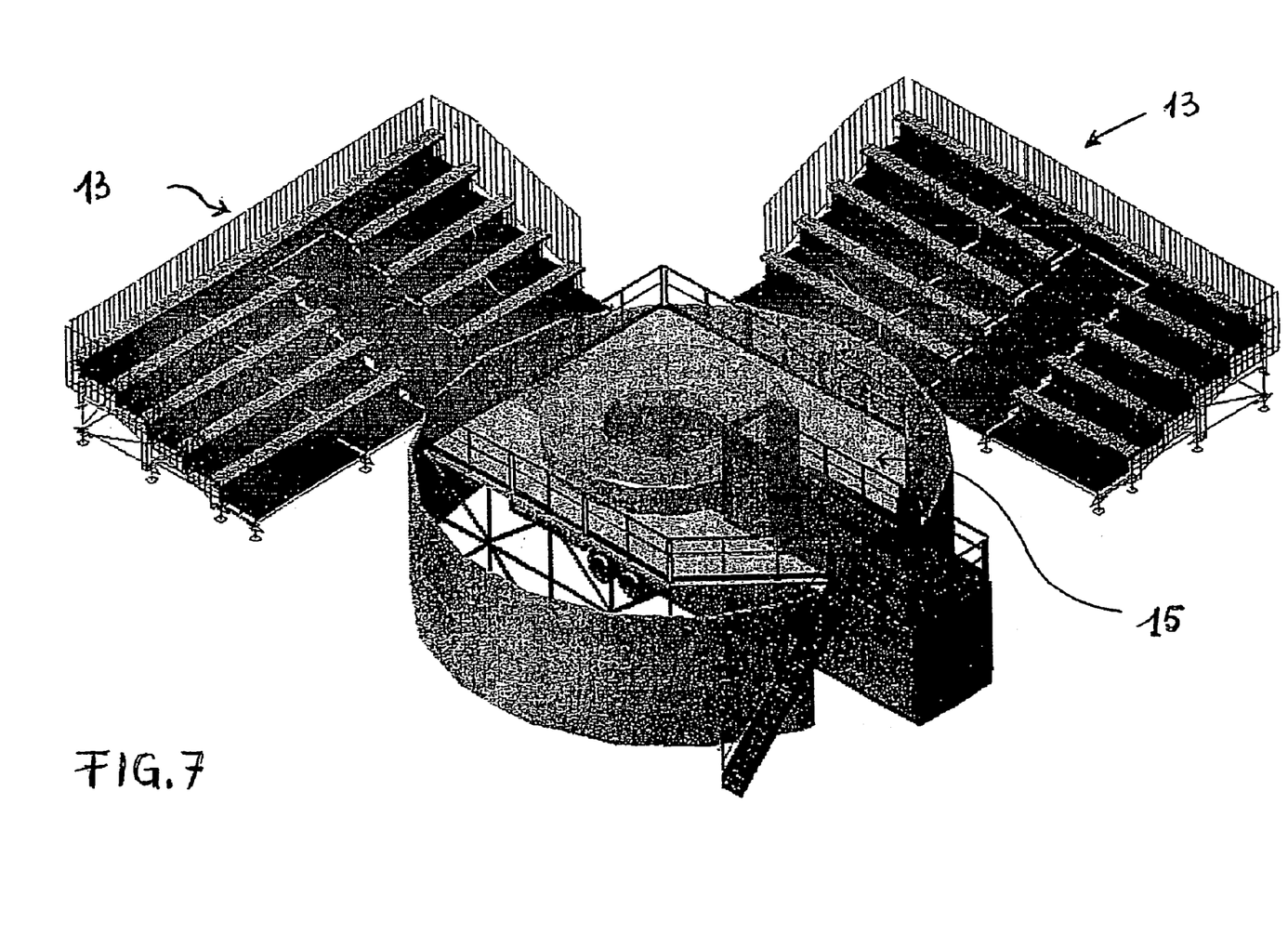
FIG. 7 is an example of an itinerant (that is travelling) structure according to the invention.

With reference to FIG. 7—showing a structure according to the present invention of the itinerant (travelling) kind—, the pattering plane defined by the flight grid, which is indicated by numeral 15, is formed by the vertical walls of an articulated lorry that are actuated by hydraulic jacks and are rotated by 90° in order to obtain a box-like structure coinciding with the transport room of the articulated lorry.

In this compact, "closed-panel-configuration", the structure is lodged completely in said box-like structure, except for the spectators stands, which are transported separately.

In the second configuration, with "open panels", or extended panels, a sufficiently large trampling plane 15 is formed (see. FIG. 7), which is used during the operation of the structure (or machine), in the course of a performance or show.

The motor of the articulated lorry is suited to operate, by its power, the propeller of this flight position.

The invention claimed is:

1. A structure used to raise persons by use of air jets, comprising:
    a flight position (3;5);
    a jet generating device (1) associated with the flight position and generating a vertical air jet, the jet generating device comprising i) a suction-and-delivery conduit (4) having a suction inlet and a delivery outlet, the delivery outlet vertically arranged and ending in proximity of the flight position (3;5), and ii) a variable pitch propeller, the propeller driven by an electric motor machine powered from an electric energy supply source, the propeller located inside said suction-and-delivery conduit (4), the propeller drawing air into the suction inlet, generating a vertically upward directed air jet, and discharging the air jet from the delivery outlet;

a support structure (2) supporting the flight position and the jet generating device;

one of an elastic membrane and net (3) provided at the flight position (3; 5) and arranged above the delivery outlet, said one of the elastic membrane and the net being sufficiently permeable to air to permit passage of the air jet;

an inverter connected between the electric motor and the electric energy supply source, said inverter configured to vary a frequency of electric current supplied to the electric motor; and a balance (7) for determining a weight of a person to be raised over the flight position by the air jet discharged from the delivery outlet, the balance electronically generating an electric signal proportional to the determined weight, said electric signal connected to control the inverter to modify the frequency of the electric current supplied to the electric motor, thereby reaching a maximum number of rpm of the variable pitch propeller (6) for the determined weight of the person, corresponding to a suitable air jet to raise the person up to a maximum pre-set height.

2. A structure according to claim 1, further comprising:
an electronic regulation system connected to adjust blade inclination of the variable pitch propeller (6), and
wherein said electric signal is further connected to the electronic regulation system to vary the pitch of the variable pitch propeller (6) and thereby modify an air flow rate by the concurrent action of the inverter and of the electronic regulation system adjusting the blade inclination of the variable pitch propeller (6).

3. A structure according to claim 2,
wherein the value of said maximum preset height is in the interval 2.5-3 meters.

4. A structure according to claim 1, wherein the balance (7) comprises a central unit forming a connector, the connector being connected to an alphanumeric display located inside a control room (14).

5. A structure according to claim 4, further comprising:
sensors connected to the inverter, and
a decoder associated with the electric motor,
wherein the sensors detect air flow velocity, and in the event of an excessive deviation of an effective value from one of a nominal air velocity value and a desired air velocity value, the sensors cause, through the inverter, a controlled slowing down of propeller (6) angular velocity, by the adjustment of the frequency of the electric current supplied to the electric motor, said nominal air velocity value being determined based on the electric signal provided by the balance (7).

6. A structure according to claim 1, further comprising:
means for storing component usage time of and for storing the statistical information concerning component failures and potential component operation anomalies.

7. A structure according to claim 1, further comprising:
injury preventing means(5) surrounding the one of the elastic membrane and net.

8. A structure according to claim 1, comprising:
plural of said flight position, wherein the plural flight positions (3; 5) are distanced from each other to a sufficient degree to exclude contacts among persons at each flight position; and
spectators stands (13) with parapets distanced from the flight positions to prevent impacts by the persons at each flight position.

9. A structure according to claim 1, wherein the structure comprises plural modules, each module comprising plural flight positions (3; 5) and respective jet generating devices (1), each module including:
N flight positions (1; 3; 5);
N balances (7), each balance associated with a corresponding one of the N flight positions; and
2×N boxes (12; 12').

10. A structure according to claim 9, wherein each module further comprises:
a stand separating one module from another module;
a respective control room (14), with an alphanumeric display for monitoring the operation of the module and for surveillance of the module;
a cash desk (10) with an entry ticket dispenser; and
an enveloping screen (11) for projections in three dimensions (3D).

11. A structure according to claim 1, further comprising an underground basin made of reinforced concrete, wherein the jet generating device (1) is inside the basin.

12. A structure according to claim 1, wherein the flight position, the jet generating device, the support structure, the inverter, and the balance are disassembly from each other.

13. A structure according to claim 1, wherein,
the electric motor comprises a drive shaft, and a joint connects the drive shaft to the variable pitch propeller, and
during operation, between operations of raising different persons at the flight position, the motor remain in rotation at a minimum predefined rpm.

14. A structure according to claim 1, wherein,
during initial operation, an air velocity of the generated vertical air jet is progressively increased until the person has reached a maximum flight height,
the progressive increase in the air velocity being performed by gradually increasing the rpm of the propeller (6), starting from a minimum predefined rpm, by simultaneously varying the propeller pitch (6) and the frequency of the current through the inverter; wherein, moreover, said maximum flight height is determined by processing the electric signal provided by said balance (7).

15. A structure according to claim 1, wherein, during final operation, the inverter progressively reduces the rpm of the motor to a minimum predefined rpm by varying the frequency of the electric current supplied to the motor.

* * * * *

UNITED STATES PATENT AND TRADEMARK OFFICE
CERTIFICATE OF CORRECTION

PATENT NO. : 7,572,189 B2　　　　　　　　　　　　　　　　　　　　　　　Page 1 of 1
APPLICATION NO. : 10/583043
DATED : August 11, 2009
INVENTOR(S) : Gentile et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 323 days.

Signed and Sealed this

Seventh Day of September, 2010

David J. Kappos
*Director of the United States Patent and Trademark Office*